United States Patent
Ulrich

(10) Patent No.: US 6,877,763 B2
(45) Date of Patent: Apr. 12, 2005

(54) INFANT SPORTS STROLLER

(76) Inventor: Phillip J. Ulrich, 13401 W. 125th St., Overland Park, KS (US) 66213

( * ) Notice: Subject to any disclaimer, the term of this patent is extended or adjusted under 35 U.S.C. 154(b) by 55 days.

(21) Appl. No.: 10/328,960

(22) Filed: Dec. 24, 2002

(65) Prior Publication Data

US 2004/0119266 A1 Jun. 24, 2004

(51) Int. Cl.⁷ .............................. B62B 7/06; B62B 9/14
(52) U.S. Cl. ....................................... 280/649; 280/658
(58) Field of Search ............................... 280/827, 1.22, 280/1.23, 642, 647, 649, 650, 657, 658, 47.38, 47.39; D12/128, 129

(56) References Cited

U.S. PATENT DOCUMENTS

| | | | | |
|---|---|---|---|---|
| 155,488 A | * | 9/1874 | Blackman | 296/35.4 |
| 1,576,501 A | * | 3/1926 | Bibo | 280/37 |
| 2,976,912 A | * | 3/1961 | Dias | 280/658 |
| 3,222,081 A | * | 12/1965 | Harmon, Jr. | 280/648 |
| 3,929,372 A | * | 12/1975 | Gesslein | 296/97.21 |
| 4,089,543 A | | 5/1978 | Osborne | |
| 4,566,292 A | * | 1/1986 | Parmet | 62/457.1 |
| D301,047 S | * | 5/1989 | Pace | D21/221 |
| D305,011 S | | 12/1989 | Pipon | |
| 5,125,712 A | | 6/1992 | Stamoutsos | |
| 5,261,690 A | | 11/1993 | Kluber | |
| D361,049 S | | 8/1995 | Beckman | |
| D365,313 S | | 12/1995 | Mosetich et al. | |
| 5,549,940 A | * | 8/1996 | Noone | 428/31 |
| D388,027 S | | 12/1997 | Polak et al. | |
| D388,748 S | * | 1/1998 | Jackson | D12/129 |
| 5,758,889 A | * | 6/1998 | Ledakis | 280/47.38 |
| D423,416 S | | 4/2000 | Shepherd | |
| 6,059,302 A | * | 5/2000 | Huang | 280/47.41 |
| 6,250,652 B1 | | 6/2001 | Nelson | |
| 6,296,259 B1 | * | 10/2001 | Anderson | 280/30 |
| 6,345,835 B1 | * | 2/2002 | Watkins | 280/650 |
| D475,659 S | * | 6/2003 | Diaz | D12/129 |

* cited by examiner

Primary Examiner—Frank Vanaman
(74) Attorney, Agent, or Firm—Dale J. Ream

(57) ABSTRACT

An infant stroller includes a lower frame with wheels coupled thereto and an upper frame extending upwardly from the lower frame. A carriage body is supported atop the upper frame and includes a bottom for supporting an infant with side, front, and rear walls extending upwardly therefrom. A canopy shaped like a helmet includes side walls pivotally coupled to the carriage body side walls adjacent the rear wall thereof. The canopy is pivotally movable between a first configuration situated substantially over a rear portion of the carriage body for shielding the infant and a second configuration substantially beneath the carriage for partially exposing the infant. A face shield bar is pivotally coupled to the canopy on which toys to amuse the infant may be suspended. The bar may be pivotally moved to a non-use configuration. Organizational indicia may be positioned or imprinted on each canopy side wall.

18 Claims, 4 Drawing Sheets

US 6,877,763 B2

INFANT SPORTS STROLLER

BACKGROUND OF THE INVENTION

This invention relates generally to baby carriages and, more particularly, to a stroller for transporting and selectively shading an infant while promoting an organization or institution.

Strollers or baby carriages are often utilized to transport infants while shopping, taking a walk, or attending entertainment activities such as ball games. A parent is often hindered from becoming fully involved in cheering and supporting his favored athletic team while pushing or attending to a conventional stroller. Although assumably effective for their intended purpose of holding an infant, existing strollers do not provide for the selective shading of a transported infant while simultaneously contributing to the parents' enjoyment of a sporting event.

Therefore, it is desirable to have an infant stroller having one or more interchangeable semi-rigid canopies in the form of athletic team helmets with institutional indicia which may be selectively and removably coupled to a carriage body to enhance a user's enjoyment while attending an athletic event. Further, it is desirable to have an infant stroller in which the canopy is pivotal between configurations above and below the carriage body for selectively shading or exposing an infant. In addition, it is desirable to have an infant stroller having a annular face shield bar pivotally coupled to the canopy for selectively suspending toys for the infant's amusement. Still further, it is desirable to have an infant stroller that is completely collapsible.

SUMMARY OF THE INVENTION

Accordingly, the present invention provides an infant stroller that maximizes the comfort and amusement of an infant as well as the entertainment of a parent caring for the infant while attending a sporting event. The present infant stroller allows a parent to become fully involved in cheering for his favored athletic team rather than feeling out of place or inhibited by the presence of a stroller. In fact, the stroller itself may function to aid the parents' cheering effort. More particularly, the infant stroller includes a semi-rigid canopy constructed in the form of an athletic helmet, e.g. a football helmet, baseball helmet, hockey helmet, etc. The canopy may be pivotally moved between a first configuration situated substantially over one end of a carriage body for shielding the face of a recumbent infant lying in the carriage body and a second configuration situated substantially below the carriage body for exposing the infant's face. Institutional or organization indicia may be positioned on the sides of the helmet for providing additional entertainment. A face shield bar is coupled to the helmet for extending across an open front thereof. When pivoted to a use configuration, toys or mobiles may be suspended therefrom for the infant's amusement. The bar may be pivoted to a collapsed configuration for storage.

Therefore, a general object of this invention is to provide an infant stroller which enhances a parent's enjoyment of an athletic event while selectively shielding an infant from sunlight.

Another object of this invention is to provide an infant stroller, as aforesaid, including a helmet-shaped canopy having a semi-rigid construction and being pivotal between shielding and exposing configurations.

Still another object of this invention is to provide an infant stroller, as aforesaid, including a face shield bar that is pivotal between usage and collapsed configurations.

Yet another object of this invention is to provide an infant stroller, as aforesaid, for use with a stroller framework that is selectively collapsible.

A further object of this invention is to provide an infant stroller, as aforesaid, in which the canopy includes institutional or organizational indicia associated with a sporting event attended by the parent and infant.

A still further object of this invention is to provide an infant stroller, as aforesaid, having a basket for storing selected articles.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
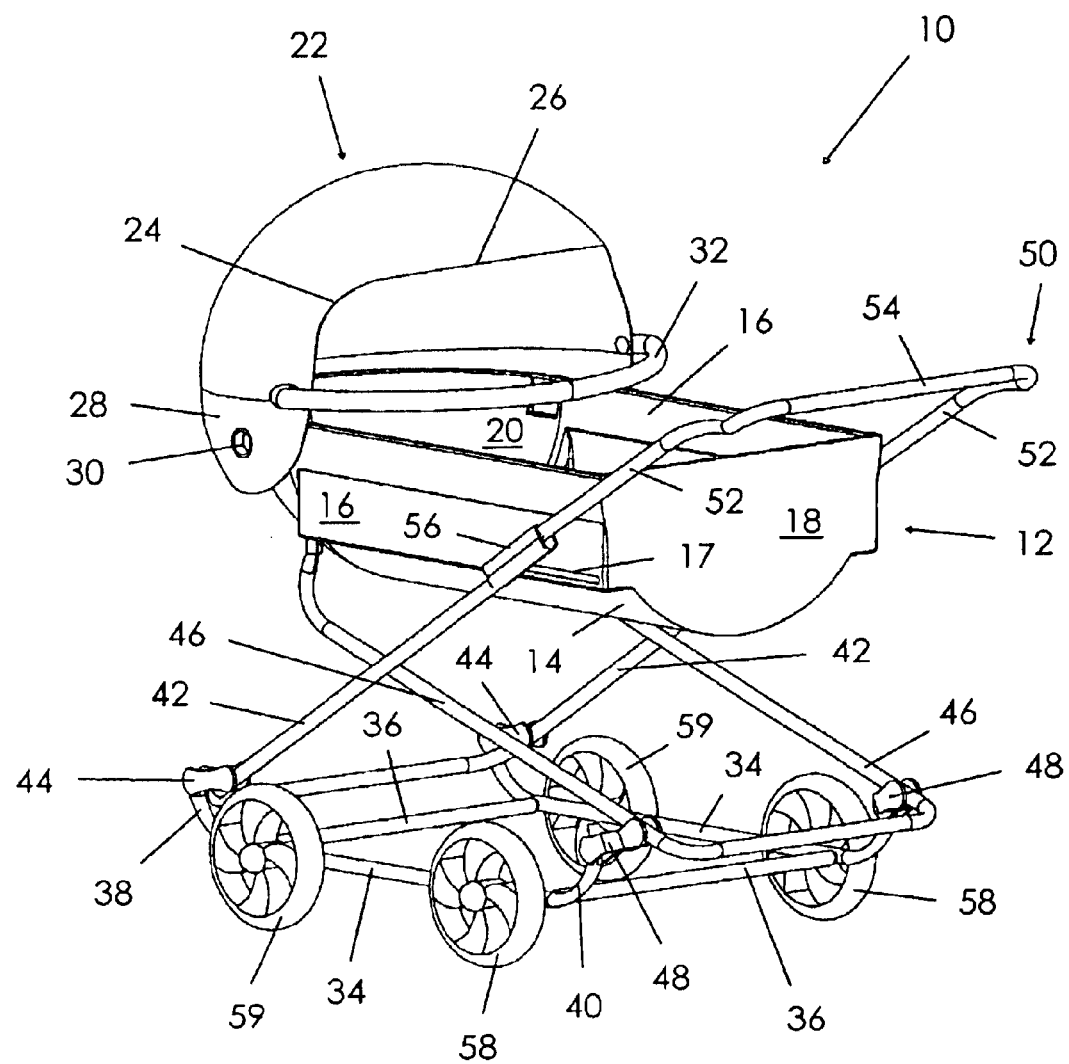
FIG. 1 is a perspective view of an infant stroller according to one embodiment of the present invention.
Figure 2:
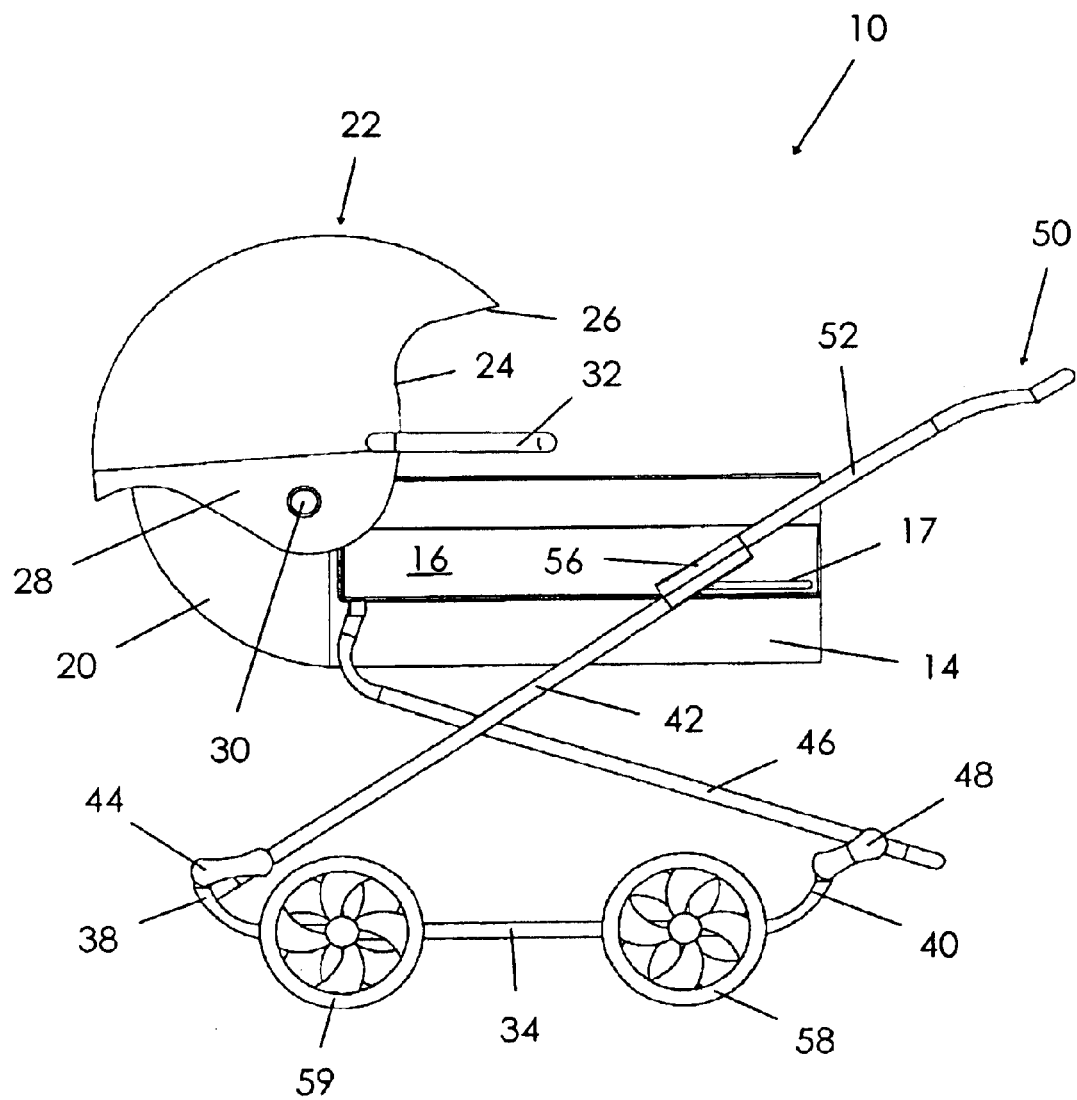
FIG. 2 is a side view of the stroller as in FIG. 1.
Figure 3:
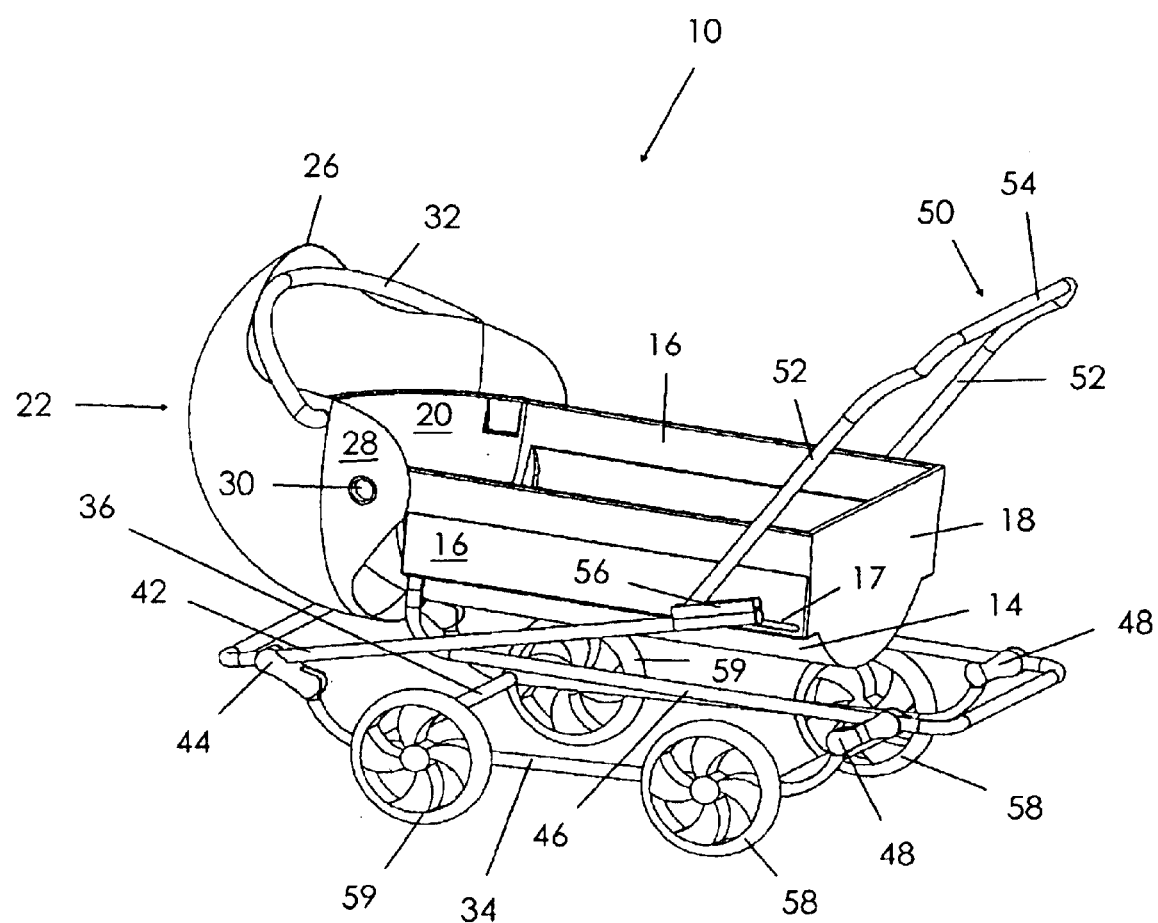
FIG. 3 is a perspective view of the stroller as in FIG. 1 in a collapsed configuration.

An infant stroller according to the present invention will now be described in detail with reference to FIGS. 1 through 4. An infant stroller 10 according to one embodiment of the present invention is shown in FIGS. 1 through 3 and includes a carriage body 12. The carriage body 12 includes a bottom 14 having a configuration for comfortably supporting a recumbent infant (FIG. 1). The carriage body 12 includes a pair of opposed side walls 16 extending upwardly from the bottom 14 and longitudinally along side edges of the bottom 14. Further, the carriage body 12 includes front 18 and rear 20 walls extending upwardly from the bottom 14 and connecting the side walls 16. The rear wall 20 may include a rearwardly lo extending bowl-shaped configuration (FIG. 2) complementary to a canopy configuration, as to be described more fully below.

The infant stroller 10 includes a canopy 22 that is releasably coupled to the carriage body 12 adjacent the rear wall 20 thereof. Preferably, the infant stroller 10 includes a plurality of canopies having different configurations that may be interchangeably coupled to the carriage body 12 as desired. Each canopy 22 is constructed of a semi-rigid recycled thermoplastic material such as polyethylene although other constructions would also be suitable. Each canopy 22 presents a generally hemispherical helmet-shaped configuration having side walls 28 simulative of earcovering portions of an athlete's helmet. Although a football helmet configuration is shown in the accompanying drawings, it is understood that the canopy may be configured in the form of a baseball helmet, hockey helmet or mask, or other sports hats/helmets.

Each canopy 22 further includes a front peripheral edge 24 that defines an open front (FIG. 1), the front peripheral edge having an upper extent 26 extending between the side walls 28. Preferably, the canopy 22 is situated such that the open front is directed toward the front wall 18 of the carriage body 12 so that a person pushing the stroller 10 can view an infant lying in the carriage body 12 (FIG. 1).

The canopy side walls 28 are flexible enough to be mounted to the carriage body 12 in a removable friction fit relationship and such that the canopy 22 is pivotally movable. In fact, the lower portion of each canopy side wall 28 includes a pivot point coupling 30 that mates with a complementary recess or coupling on the carriage body side walls 16 to enable smooth pivotal movement. More particularly, the canopy 22 is pivotally movable between a first configuration in which the canopy 22 is positioned substantially above the carriage body 12 over the end of the carriage body 12 adjacent the rear wall 20 (FIG. 1) and a second configuration positioned rearwardly and below the rear end of the carriage body 12 (FIG. 3). FIGS. 2 and 3 illustrate how the rounded configuration of the rear wall 20 is complementary to the generally rounded/dome-shaped configuration of the canopy 22 such that the canopy 22 may be selectively pivoted thereabout.

Further, a face shield bar 32 having a generally annular configuration includes a pair of ends pivotally coupled to the opposed side walls 28 of the canopy 22 such that the bar 32 extends across the open front of the canopy 22. More particularly, the bar 32 is pivotal between a collapsed configuration adjacent to or even in contact with the upper extent 26 of the front peripheral edge 24 of the canopy 22 (FIG. 2) and a use configuration displaced from the upper extent 26 (FIG. 3). A toy or infant mobile may be suspended from the bar 32 when the bar is in the use configuration for the infant's amusement. The configuration of the bar 32 in the collapsed configuration (FIG. 3) allows the carriage body 12 to be compactly stored or enables the infant to be freely removed therefrom. The bar 32 may be pivoted independently of pivoting the canopy 22.

The carriage body 12 may be mounted to a stroller framework although it is understood that the carriage body 12 may be used apart from the framework, such as by being carried with a handle. More particularly, the stroller framework includes a lower framework having a pair of laterally spaced apart and longitudinally extending side support members 34 that are connected by one or more laterally extending struts 36 (FIG. 1). Each side support member 34 includes opposed first 38 and second 40 ends. A pair of front wheels 58 are rotatably coupled to opposed side support members 34. A pair of rear wheels 59 are also mounted to the side support members 34 rearward of the front wheels 58. The stroller framework further includes an upper framework having a pair of first support legs 42 having lower ends pivotally coupled to respective first ends 38 of the lower framework side support members 34 with corresponding first couplings 44. The upper framework also includes a pair of second support legs 46 having lower ends pivotally coupled to respective second ends 40 of the lower framework side support members 34 with second couplings 48. Corresponding first 42 and second 46 support legs extend upwardly in a scissors-like configuration for collapsibility as to be described below.

Each second support leg 46 includes an upper end connected to the bottom 14 of the carriage body 12 adjacent the rear wall 20 thereof. Similarly, each first support leg 42 includes an upper end coupled to a carriage body side wall 16 adjacent the front wall 18 thereof. However, each carriage body side wall 16 defines a slot 17 extending rearwardly from the front wall 18 to the point at which a respective first support leg 42 is coupled. The upper ends of the first support legs 42 may then be selectively moved along these slots 17 for collapsing the framework to a storage configuration.

Further, the upper framework includes a handle member 50 having a generally U-shaped configuration with opposed side arms 52 connected by a handle 54. The side arms 52 are pivotally coupled to upper ends of corresponding first support legs 42 such that the handle member 50 is selectively pivotal between a use configuration in which the side arms 52 are in linear alignment with corresponding first support legs 42 (FIG. 1) and a collapsed configuration in which said side arms 52 are angularly displaced from corresponding first support legs 42 (FIG. 3). The handle side arms 52 are releasably held in the use configuration with friction fit couplings 56 or other suitable couplings.

In use, a user may secure the upper framework in an extended/use configuration supporting the carriage body 12 thereby. The canopy 22 may be selectively pivoted to a shade configuration situated over the rear end of the carriage body (FIG. 1) and such that a user can see a recumbent infant through the open front. The face shield bar 32 may be pivoted to a use configuration in which toys or mobiles may be suspended therefrom. Therefore, while the infant is shaded comfortably, the user may feel comfortable cheering for a desired team at a sporting event and experience the enjoyment of having a stroller which blends in with the ambience of the event. If shading is no longer desired, the canopy 22 may be pivoted to the second configuration situated rearward and beneath the carriage body 12 (FIG. 3). Also, the bar 32 may be pivoted to a collapsed configuration (FIG. 3). When the stroller is no longer needed, the framework may be collapsed for storage (FIG. 3).

Figure 4:
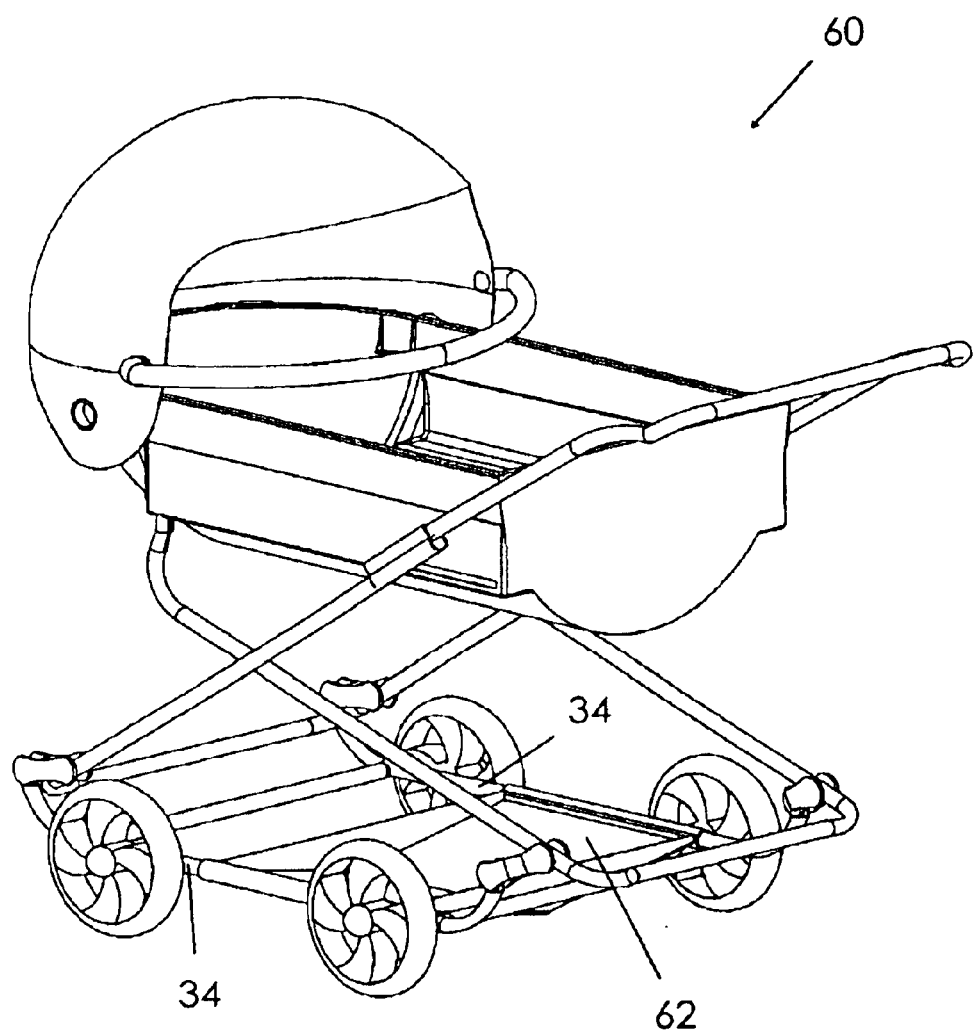
FIG. 4 is a perspective view of an infant stroller according to another embodiment of the present invention.

An infant stroller 60 according to another embodiment of the present invention is shown in FIG. 4 and includes a construction substantially similar to the stroller 10 described above except as specifically noted below. More particularly, this stroller 60 includes an accessory bin 62 or basket. The bin 62 includes a platform extending between the side support members 34 of the lower framework for supporting selected items thereon, such as a baby bag or the like. Of course, the storage bin 62 may be constructed of a solid material or be a netted basket or the like.

It is understood that while certain forms of this invention have been illustrated and described, it is not limited thereto except insofar as such limitations are included in the following claims and allowable functional equivalents thereof.

What is claimed is:

1. An infant carrying apparatus for use upon a stroller frame, said apparatus comprising:

a carriage body adapted to be mounted to said stroller frame, said carriage body having a bottom for supporting a recumbent infant and having a pair of carriage body side walls extending upwardly from said bottom with front and rear walls connecting said pair of carriage body side walls;

a canopy having a generally hemispherical configuration, said canopy include a front peripheral edge defining an open front, said canopy having canopy side walls pivotally coupled to corresponding carriage body side walls adjacent said rear wall such that said canopy is movable between a first configuration situated over said carriage body adjacent said rear wall so as to shield the recumbent infant and a second configuration situated partially beneath said carriage body adjacent said rear wall so as to expose the recumbent infant; and a bar having an annular configuration and having opposed ends pivotally coupled to respective canopy side walls, said bar being movable between a collapsed configuration adjacent said front peripheral edge and a use configuration displaced from said front peripheral edge.

2. The infant carrying apparatus as in claim 1 wherein said canopy is constructed of a semi-rigid thermoplastic material.

3. The infant carrying apparatus as in claim 1 further comprising an organizational or institutional indicia imprinted on each side wall of said canopy.

4. The infant carrying apparatus as in claim 1 wherein said canopy is releasably coupled to said side walls of said carriage body.

5. The infant carrying apparatus as in claim 1 wherein said canopy is configured in the shape of a football helmet.

6. The infant carrying apparatus as in claim 1 wherein:

said canopy is constructed of a semi-rigid material that is releasably coupled to said canopy side walls.

7. An infant stroller, comprising:

a lower framework having a pair of laterally spaced apart side support members;

a pair of front wheels rotatably mounted to respective side support members;

a pair of rear wheels rotatably mounted to said respective side support members rearwardly of said front wheels;

an upper framework having pairs of first and second support legs coupled to said side support members of said lower framework in a crossed configuration and extending upwardly therefrom;

a carriage body coupled to said upper framework and supported thereby, said carriage body having a bottom for supporting a recumbent infant carriage body side walls extending upwardly from said bottom with front and rear walls connecting said pair of carriage body side walls;

a canopy having a generally hemispherical configuration defining an open front, said canopy having canopy side walls pivotally coupled to corresponding carriage body side walls adjacent said rear wall such that said canopy is movable between a first configuration situated over said carriage body adjacent said rear wall for shielding the recumbent infant and a second configuration situated partially beneath said carriage body adjacent said rear wall for exposing the recumbent infant;

wherein lower ends of said pairs of first and second support legs are pivotally coupled to respective side support members of said lower framework;

wherein said carriage body side walls define a pair of slots extending horizontally between said front wall and said upper ends of said first support legs; and further comprising means for selectively moving said upper ends of said first support legs along said pair of slots, whereby to selectively collapse said upper framework for storage.

8. The infant stroller as in claim 7 further comprising a handle member having side arms pivotally coupled to upper ends of said pair of first support legs of said upper framework, said handle member being selectively movable between a use configuration in which said side arms are in linear alignment with corresponding first support legs and a collapsed configuration in which said side arms are angularly displaced from said corresponding first support legs.

9. The infant stroller as in claim 8 wherein said canopy includes a front peripheral edge defining said open front; and said infant stroller further comprising a bar having an annular configuration and having opposed ends pivotally coupled to respective canopy side walls, said bar being movable between a collapsed configuration adjacent said front peripheral edge and a use configuration displaced from said front peripheral edge.

10. The infant stroller as in claim 7 wherein said canopy includes a front peripheral edge defining said open front; and said infant stroller further comprising a bar having an annular configuration and having opposed ends pivotally coupled to respective canopy side walls, said bar being movable between a collapsed configuration adjacent said front peripheral edge and a use configuration displaced from said front peripheral edge.

11. The infant stroller as in claim 7 wherein said canopy is releasably coupled to said carriage body side walls in a friction fit relationship.

12. The infant stroller as in claim 11 wherein said canopy includes a semi-rigid thermoplastic construction.

13. The infant stroller as in claim 11 further comprising an organizational or institutional indicia imprinted on each canopy side wall.

14. The infant stroller as in claim 7 wherein said canopy is configured in the shape of a football helmet.

15. The infant stroller as in claim 7 further comprising means extending between said side support members of said lower framework for storing selected items.

16. A stroller for transporting and selectively shading an infant, comprising:

a lower framework having a pair of laterally spaced apart side support members with at least one strut extending therebetween;

a pair of front wheels rotatably mounted to respective side support members;

a pair of rear wheels rotatably mounted to said respective side support members rearwardly of said front wheels;

an upper framework having a pair of first support legs pivotally coupled to first ends of respective side support members and a pair of second support legs pivotally coupled to second ends of said respective side support members, said pair of first and second support legs extending upwardly from said side support members in a crossed configuration;

a carriage body coupled to upper ends of said pairs of first and second support legs for support thereby, said carriage body having a bottom for supporting a recumbent infant and having a pair of carriage body side walls extending upwardly from said bottom with front and rear walls connecting said pair of side walls;

a canopy having a generally helmet-shaped configuration with a front peripheral edge defining an open front, said canopy having canopy side walls pivotally and releasably coupled to said pair of carriage body side walls adjacent said rear wall such that said canopy is movable between a first configuration substantially situated above said carriage body and a second configuration substantially situated beneath said carriage body, whereby to selectively shield or expose the recumbent infant, respectively;

an organizational or institutional indicia imprinted on each canopy side wall; and a bar having an annular configuration and having opposed ends pivotally coupled to respective canopy side walls, said bar being movable between a collapsed configuration adjacent an upper extent of said front peripheral edge and a use configuration displaced from said upper extent.

17. The stroller as in claim 16 wherein said carriage body side walls define a pair of slots extending horizontally between said front wall and said upper ends of said first support legs; said stroller further comprising:

means for selectively moving said upper ends of said first support legs along said pair of slots, whereby to selectively collapse said upper framework for storage;

a handle member having a pair of side arms pivotally coupled to said upper ends of said pair of first support legs of said upper framework, said handle member being selectively movable between a use configuration in which said pair of side arms are in linear alignment with corresponding first support legs and a collapsed configuration in which said side arms are angularly displaced from said corresponding first support legs.

18. The stroller as in claim 16 further comprising means extending between said side support members of said lower framework for storing selected items.

* * * * *